US012154704B2

(12) United States Patent
Frahmann et al.

(10) Patent No.: US 12,154,704 B2
(45) Date of Patent: Nov. 26, 2024

(54) CABLE SHIELDING

(71) Applicant: BIZLINK INDUSTRY GERMANY GMBH, Roth (DE)

(72) Inventors: Arno Frahmann, Kleefeld (DE); Maik Stratmann, Friesoythe (DE); Hüseyin Turan, Garrel (DE)

(73) Assignee: BIZLINK INDUSTRY GERMANY GMBH, Roth (DE)

( * ) Notice: Subject to any disclaimer, the term of this patent is extended or adjusted under 35 U.S.C. 154(b) by 169 days.

(21) Appl. No.: 17/910,061

(22) PCT Filed: Mar. 19, 2021

(86) PCT No.: PCT/EP2021/057081
§ 371 (c)(1),
(2) Date: Sep. 8, 2022

(87) PCT Pub. No.: WO2021/191075
PCT Pub. Date: Sep. 30, 2021

(65) Prior Publication Data

US 2023/0104371 A1 Apr. 6, 2023

(30) Foreign Application Priority Data

Mar. 24, 2020 (DE) ......................... 102020108058.1

(51) Int. Cl.
*H01B 7/22* (2006.01)

(52) U.S. Cl.
CPC .................................... *H01B 7/228* (2013.01)

(58) Field of Classification Search
CPC ......... H01B 7/228; H01B 9/023; H01B 9/025
See application file for complete search history.

(56) References Cited

U.S. PATENT DOCUMENTS

2006/0048966 A1* 3/2006 Takahashi ............ H01B 11/002
174/108

FOREIGN PATENT DOCUMENTS

| | | | |
|---|---|---|---|
| CN | 109102986 | A | 12/2018 |
| EP | 2725585 | A1 | 4/2014 |
| GB | 339425 | | 12/1930 |

* cited by examiner

*Primary Examiner* — Hoa C Nguyen
*Assistant Examiner* — Amol H Patel
(74) *Attorney, Agent, or Firm* — Tarolli, Sundheim, Covell & Tummino LLP

(57) ABSTRACT

A cable shielding and an electrical conductor having such a cable shielding are provided. The cable shielding has a first wire winding and a second wire winding. The first wire winding has a plurality of turns. The first wire winding is wound in a first direction with a first pitch about a longitudinal axis. The second wire winding has a plurality of turns. The second wire winding is wound in a second direction, which is different from the first direction, with a second pitch about the longitudinal axis. Turns of the plurality of turns of the first wire winding and corresponding turns of the plurality of turns of the second wire winding cross one another in each case at a first crossing point in such a way that a plurality of first crossing points of the first wire winding and the second wire winding are present in the direction of the longitudinal axis. The plurality of first crossing points run at least approximately helically in the direction of the longitudinal axis.

11 Claims, 2 Drawing Sheets

CABLE SHIELDING

Figure 1A:
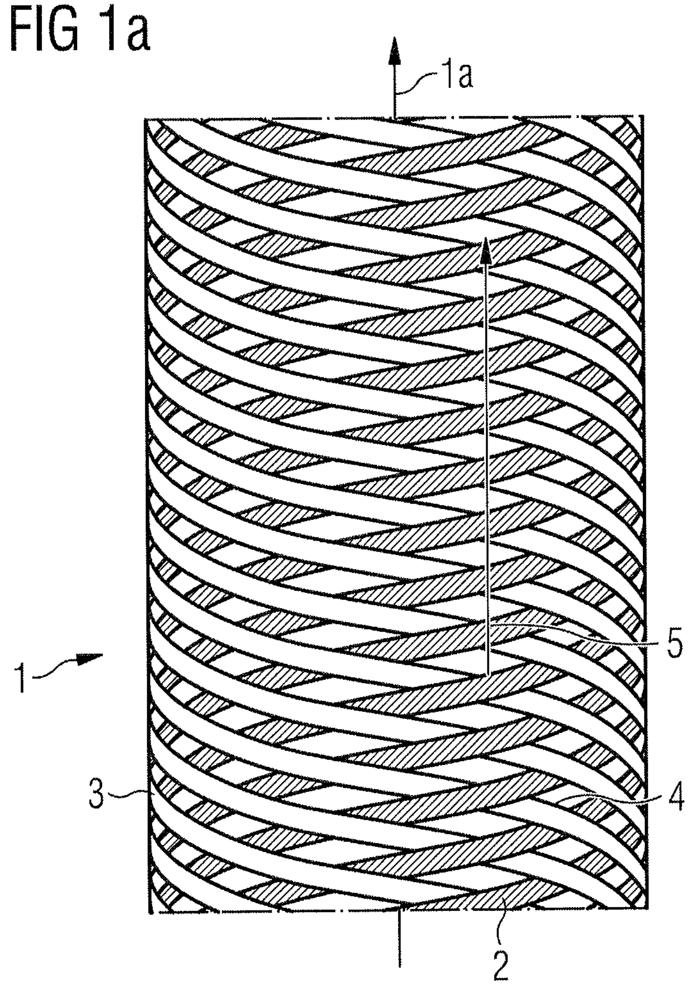

This application filed under 35 U.S.C § 371 is a national phase application of International Application Number PCT/EP2021/057081, filed Mar. 19, 2021, which claims the benefit of German Application No. 10 2020 108 058.1 filed Mar. 24, 2020, the subject matter of which are incorporated herein by reference in their entirety.

The present invention relates to cable shielding and an electric cable having such cable shielding.

Shielding is an electrically conductive protective sheathing that encloses apparatus, a room or a transmission medium, e.g. a cable. For the purpose of differentiation, shielding for apparatus is often referred to as device shielding, shielding for a room as room shielding and shielding for a transmission medium as cable shielding.

Cable shielding is used on transmission media such as e.g. electric cables. Electric cables conduct power for various purposes. A current flow in an electric cable always generates a magnetic field accompanying the current flow. It is generally desirable to reduce effects e.g. of such a magnetic field on other apparatus and devices, as it can lead in the case of these to undesirable malfunctions of electrical or electronic operating equipment. This is often summarised under the term of electromagnetic compatibility (EMC). Shielding reduces electromagnetic interference on signal-carrying cables or in apparatus on the one hand. On the other hand, the shielding also reduces leakage from a cable or apparatus into the environment.

In cable shielding, a distinction is drawn between foil and braided shielding and the combination of both. Foil shielding is more efficient at higher frequencies, whereas braided shielding is more efficient at lower frequencies. Foil and braided shielding can also be combined and placed e.g. in alternating layers. The quality of the shielding depends on the cover and is expressed in the shielding attenuation or the shielding effectiveness. It goes directly into the coupling resistance, also termed shield coupling impedance or transfer impedance. The transfer impedance is the ratio of the high-frequency (HF) interference voltage induced on a data line to the inducing HF interference current flowing over the shield. The smaller the transfer impedance, the better the shield effect. In addition to the cable shielding mentioned, there are also special cables in which the shielding is a copper tube. These cables are distinguished by very high shielding effectiveness.

Apart from stress in relation to its electrical and/or magnetic properties, cable shielding is also exposed to mechanical stresses. In braided shielding, the wires of a braid that are exposed to movement experience movement relative to one another with accompanying friction. Furthermore, these wires experience tractive and thrust loads.

A limited service life of the wires and thus of the braid results from this. A shield with opposed wire covering has a higher mechanical service life. The shielding can move here, however, resulting in some cases in e.g. nests and/or holes. As stated above, this has a negative influence on the electrical properties.

A requirement therefore exists for improved cable shielding. In particular, a requirement exists for cable shielding that is more resistant with respect to mechanical stresses and consequently has more stable electrical properties.

According to a first aspect of the invention, cable shielding is proposed. The cable shielding has a first wire winding and a second wire winding. The first wire winding has a plurality of turns. The first wire winding is wound in a first direction with a first pitch about a longitudinal axis. The second wire winding has a plurality of turns. The second wire winding is wound in a second direction, which is different from the first direction, with a second pitch about the longitudinal axis. Turns of the plurality of turns of the first wire winding and corresponding turns of the plurality of turns of the second wire winding cross one another in each case at a first crossing point. The turns of the plurality of turns of the first wire winding and the corresponding turns of the plurality of turns of the second wire winding cross one another in each case at the first crossing point in such a way that a plurality of first crossing points of the first wire winding and the second wire winding are present in the direction of the longitudinal axis. The plurality of first crossing points runs at least approximately helically in the direction of the longitudinal axis.

The helical progression can also be described as a coil-shaped or spiral progression. The helical progression of the first crossing points (which can also be described as overlap points) ensures good/increased stability against drag, torsional and flexural fatigue movement. The longitudinal axis can be the longitudinal axis of the cable shielding (braided shielding). The cable shielding can be at least approximately cylindrical. The crossing points can therefore run helically along the cable shielding (braided shielding).

The first wire winding can have at least one first wire. The at least one first wire can be wound about the longitudinal axis in such a way that a helical progression of the first wire winding about the longitudinal axis ensues. The second wire winding can have at least one second wire. The at least one second wire can be wound about the longitudinal axis in such a way that a helical (coil-shaped/spiral) progression of the second wire winding about the longitudinal axis ensues.

In the cable shielding, the arrangement of the first wire winding and the second wire winding relative to one another can be regarded as a combination of wire covering and braid on account of the wires intertwined at least once per turn, wherein the two wire windings are intertwined with themselves at least at one point of the turn. The cable shielding can be described in this respect as a two-layer wire covering with crossing points running helically/an intersection running helically.

A turn of the first second wire winding can be understood in a circumferential direction as a complete revolution from a starting position to an end position. In this case, taking the first pitch into consideration, the starting position and the end position do not have to coincide in the direction of the longitudinal axis. The starting position and the end position must only coincide in the circumferential direction about the longitudinal axis so that a turn results. The starting position and end position will differ from one another in the direction of the longitudinal axis if the first pitch is not equal to 0. A turn of the second wire winding can be understood in a circumferential direction as a complete revolution from a starting position to an end position. In this case, taking the second pitch into consideration, the starting position and the end position do not have to coincide in the direction of the longitudinal axis. The starting position and the end position must only coincide in the circumferential direction about the longitudinal axis so that a turn results. The starting position and end position will differ from one another in the direction of the longitudinal axis if the second pitch is not equal to 0.

By "corresponding turns" it is to be understood accordingly that a turn of the first wire winding and of the second wire winding correspond in each case when they at least virtually correspond in their position and, for example, at least virtually correspond such that they can cross in their normal progression in the case of opposing winding.

The turns of the plurality of turns of the first wire winding and the corresponding turns of the plurality of turns of the second wire winding can cross in each case at a second crossing point. The turns of the plurality of turns of the first wire winding and the corresponding turns of the plurality of turns of the second wire winding can cross in each case at a second crossing point such that a plurality of second crossing points of the first wire winding and the second wire winding is present in the direction of the longitudinal axis. The plurality of second crossing points can run at least approximately helically in the direction of the longitudinal axis.

The progression of the plurality of first crossing points in the direction of the longitudinal axis and the progression of the plurality of second crossing points in the direction of the longitudinal axis can be at least virtually parallel to one another. Two at least virtually parallel helices (coils/spirals) of crossing points can result in consequence.

Turns of the plurality of turns of the first wire winding and corresponding turns of the plurality of turns of the second wire winding can cross in each case at several crossing points. The turns of the plurality of turns of the first wire winding and corresponding turns of the plurality of turns of the second wire winding can cross in each case at several crossing points such that a plurality of several crossing points of the first wire winding and the second wire winding is present in the direction of the longitudinal axis. The plurality of several crossing points can run in each case at least approximately helically in the direction of the longitudinal axis. The plurality of several crossing points can run in each case at least approximately parallel to one another in the direction of the longitudinal axis.

The plurality of several crossing points can run at least approximately parallel to one another in the direction of the longitudinal axis. Expressed another way, a helical progression of a plurality of first crossing points can run parallel to a helical progression of a plurality of second crossing points and if applicable to a helical progression of a plurality of third crossing points etc.

The first pitch and the second pitch can have the same value. The first direction of the first wire winding and the second direction of the second wire winding differ from one another. The first direction and the second direction can be at least virtually opposed to one another. In this respect the first wire winding and the second wire winding can be described as wire windings in the opposite direction. The first wire winding and the second wire winding can accordingly run in the opposite direction and with the same pitch.

The first wire winding and the second wire winding can generally cross at their crossing points in such a way that they are intertwined with one another at the crossing points. An opposed braid, i.e. a braid of two wire windings running in the opposite direction, can be provided thereby.

The first wire winding and the second wire winding can run symmetrically to a plane through the longitudinal axis of the cable shielding, for example. Seen in the cross section of the cable shielding, the first wire winding and the second wire winding can be arranged symmetrically, e.g. symmetrically to the longitudinal axis of the cable shielding, to one another. The first wire winding can have one or more first wires or consist of one or more first wires. The second wire winding can have one or more second wires or consist of one or more second wires. Expressed another way, a single first wire or a first wire bundle can form the first wire winding and a single second wire or a second wire bundle can form the second wire winding.

The crossing points/overlap point running helically increase the stability of the cable shielding against drag, torsional and/or flexural fatigue movement. The service life of shielding of cables in the case of mechanical stress can therefore be increased in two or three dimensions by the cable shielding according to the first aspect. This is accompanied by better electrical properties (i.e. a better electrical performance e.g. in regard to EMC, leakage currents etc.) over the service life of the cable shielding.

According to a second aspect, an electric cable is proposed. The electric cable has at least one electrical conductor and cable shielding according to the first aspect arranged around the electrical conductor.

Due to the shielding, the measurable magnetic field of the electrical conductor is (considerably) reduced compared with known conductors without shielding. In addition, the cable shielding is mechanically stable. Furthermore, a cable sheath/outer sheath can be arranged around the cable shielding.

Even if some of the aspects and details described above were described with regard to the cable shielding according to the first aspect, these aspects can also be realised in a corresponding manner in the cable according to the second aspect.

Figure 1B:
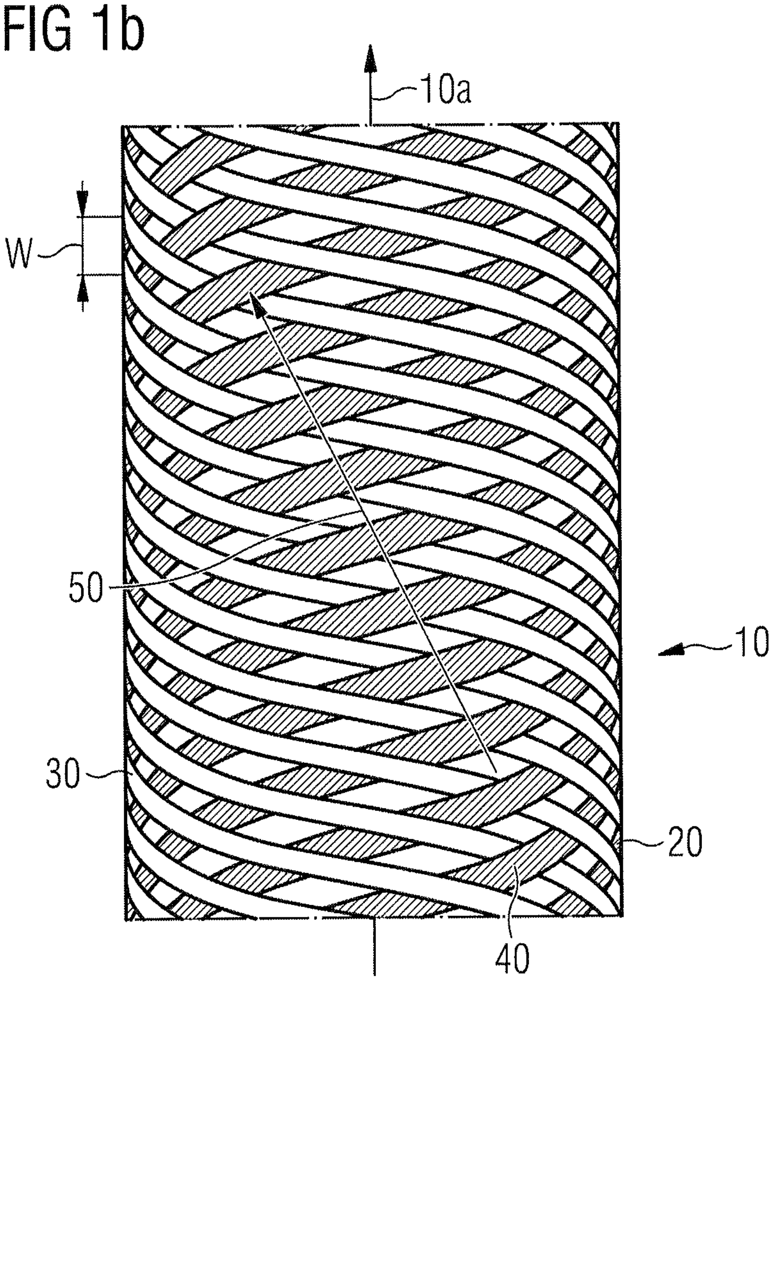

The present disclosure is to be explained further on the basis of figures. These figures show schematically:

FIG. 1*a* cable shielding according to an example;

FIG. 1*b* cable shielding according to a possible embodiment of the present invention.

In the following, without being restricted hereto, specific details are explained to deliver a complete understanding of the present disclosure. It is clear to an expert, however, that the present disclosure can be used in other exemplary embodiments that may differ from the details set out below.

FIG. 1*a* shows schematically cable shielding, more precisely braided shielding 1 for a cable. The braided shielding 1 has a first wire winding 2, which extends in a first rotary direction with a first pitch spirally in the direction of a longitudinal axis 1*a* of the braided shielding 1. Expressed another way, seen from the lower end of the braided shielding 1, i.e. in the direction of the arrow of the longitudinal axis 1*a*, the first wire winding 2 coils with a first pitch upwards in a counter-clockwise manner. The braided shielding 1 has a second wire winding 3, which extends in a second rotary direction with a second pitch spirally in the direction of the longitudinal axis 1*a* of the braided shielding 1. Expressed another way, seen from the lower end of the braided shielding 1, i.e. in the direction of the arrow of the longitudinal axis 1*a*, the second wire winding 3 coils with a second pitch upwards in a clockwise manner. In the example from FIG. 1*a*, the first pitch corresponds to the second pitch.

As is to be recognised in FIG. 1*a*, a turn of the first wire winding 2 and a turn of the second wire winding 3 overlap at a point. This point is described as crossing point 4 or overlap point. In the example from FIG. 1*a*, the two wire windings 2, 3 are intertwined with one another at the crossing point 4. Since each of the wire windings 2, 3 has a plurality of turns in the direction of the longitudinal axis 1*a*, several such crossing points exist in the direction of the longitudinal axis 1*a*, even in the case of one crossing point per turn. In the example from FIG. 1*a*, it is to be recognised that these crossing points lie on a straight line 5, which runs parallel to the direction of the longitudinal axis 1*a*. The two wire windings 2, 3 form two layers, so to speak, due to the intertwining and can accordingly also be described as two-layer wire covering and, on account of the parallelism of the crossing points to the longitudinal axis 1*a*, as two-layer wire covering with intersection running axially.

The wires/wire windings 2, 3 of the braid/braided shield 1 from FIG. 1*a* experience a movement relative to one another with accompanying friction when they are exposed to movement. Furthermore, these wires/wire windings 2, 3 experience tractive and thrust loads. This results in a limited service life of the wires/wire windings 2, 3 and thus of the braid/braided shield 1.

Although a braided shield 1 from FIG. 1*a* with the opposed wire covering shown has a relatively high mechanical service life and a higher mechanical service life than conventional braids, for example of wires with the same orientation, the braided shielding 1 can move, or more precisely, the wires of the braided shielding 1 can move and form e.g. nests and holes. This has a negative influence on the electrical properties of the braided shielding 1.

FIG. 1*b* shows cable shielding, more precisely braided shielding 10 for a cable, schematically according to an exemplary embodiment with improved properties compared with the cable shielding from FIG. 1*a*. The braided shielding 10 has a first wire winding 20, which extends in a first rotary direction with a first pitch spirally in the direction of a longitudinal axis 10*a* of the braided shielding 10. Expressed another way, seen from the lower end of the braided shielding 10, i.e. in the direction of the arrow of the longitudinal axis 10*a*, the first wire winding 20 coils with a first pitch upwards in a counter-clockwise manner. The braided shielding 10 has a second wire winding 30, which extends in a second rotary direction with a second pitch spirally in the direction of the longitudinal axis 10*a* of the braided shielding 10. Expressed another way, seen from the lower end of the braided shielding 10, i.e. in the direction of the arrow of the longitudinal axis 10*a*, the second wire winding 30 coils with a second pitch upwards in a clockwise manner. In the example from FIG. 1*b*, the first pitch corresponds to the second pitch, i.e. each individual complete turn of the wire windings 20, 30 covers the same path W in the direction of the longitudinal axis 10*a*. A turn describes here a complete revolution of a wire of the respective wire winding 20, 30.

As is to be recognised in FIG. 1*b*, a turn of the first wire winding 20 and a turn of the second wire winding 30 each overlap at a point. This point is described as crossing point 40 or overlap point. In the example from FIG. 1*b*, the two wire windings 20, 30 are also intertwined with one another at the crossing point 40. Since each of the wire windings 20, 30 has a plurality of turns in the direction of the longitudinal axis 10*a*, several such crossing points 40 exist in the direction of the longitudinal axis 10*a*, even with one crossing point per turn. In the example from FIG. 1*b*, it is to be recognised that these crossing points 40 run in the form of a helix 50 or spiral, i.e. do not form any straight lines running parallel to the direction of the longitudinal axis 10*a*. The two wire windings 20, 30 form two layers, so to speak, due to the intertwining and can accordingly also be described as two-layer wire covering and, on account of the helical progression 50 of the crossing points 40, as two-layer wire covering with intersection running helically.

For the sake of simplicity and clarity, only one crossing point 40 per turn, more precisely per turn of the wire winding 20 and corresponding turn of the wire winding 30, is shown in FIG. 1*b*. A turn of the wire winding 20 and a corresponding turn of the wire winding 30 can cross at more than one point, however, i.e. at several points, i.e. have several crossing points respectively at which they are intertwined with one another. For example, the wire winding 20 and the wire winding 30 are intertwined with one another at one or more, e.g. at each, of their turns not only once, but twice or if applicable several times and accordingly have a first crossing point 40, a second crossing point and if applicable further crossing points per turn. In this case a plurality of first crossing points 40, a plurality of second crossing points and if applicable a plurality of further crossing points are present in the direction of the longitudinal axis 10*a*. The plurality of first crossing points 40 can be described by a first helix/spiral 50 in the direction of the longitudinal axis 10*a*. The plurality of second crossing points can be described by a second helix/spiral in the direction of the longitudinal axis 10*a* that runs parallel to the first helix/spiral 50. The plurality of further crossing points can be described by a further helix/spiral in the direction of the longitudinal axis 10*a* that runs parallel to the first helix/spiral 50 and the second helix/spiral.

The braided shielding 10 described with regard to FIG. 1*b* with overlap points 40 running helically is more stable against drag, torsional and flexural fatigue movement than the braided shielding 1 with overlap points 4 running axially and described with regard to FIG. 1*a*. A shielding as a combination of wire covering and braid is provided by the braided shielding 10 that is intertwined with itself, per turn pair, only at one point of the circumference or at several points of the circumference. The intertwined point(s) runs/run helically along the longitudinal axis 10*a*, such as e.g. the product axis, of the braided shielding 10. This increases the service life of the shielding 10 of cables in the event of mechanical stress in two or three dimensions. Better electrical properties (i.e. a better electrical performance) are additionally achieved thus over the service life (e.g. in respect of EMC, leakage currents etc.).

The invention claimed is:

1. Cable shielding having:

a first wire winding with a plurality of turns, wherein the first wire winding is wound in a first direction with a first pitch about a longitudinal axis;

a second wire winding with a plurality of turns, wherein the second wire winding is wound in a second direction, which is different from the first direction, with a second pitch about the longitudinal axis;

wherein turns of the plurality of turns of the first wire winding and corresponding turns of the plurality of turns of the second wire winding cross in each case at a first crossing point such that they are intertwined with one another at the first crossing points and that a plurality of first crossing points of the first wire winding and of the second wire winding is present in the direction of the longitudinal axis and the plurality of first crossing points runs at least approximately helically in the direction of the longitudinal axis.

2. Cable shielding according to claim 1, wherein the turns of the plurality of turns of the first wire winding and the corresponding turns of the plurality of turns of the second wire winding cross in each case at a second crossing point such that they are intertwined with one another and that a plurality of second crossing points of the first wire winding and of the second wire winding is present in the direction of the longitudinal axis and the plurality of second crossing points runs at least approximately helically in the direction of the longitudinal axis.

3. Cable shielding according to claim 1, wherein turns of the plurality of turns of the first wire winding and corresponding turns of the plurality of turns of the second wire winding cross in each case at several crossing points such that a plurality of several crossing points of the first wire winding and of the second wire winding is present in the direction of the longitudinal axis and the plurality of several crossing points runs respectively at least approximately helically in the direction of the longitudinal axis in each case.

4. Cable shielding according to claim 3, wherein the plurality of several crossing points runs respectively at least approximately parallel to one another in the direction of the longitudinal axis.

5. Cable shielding according to claim 1, wherein the first pitch and the second pitch have the same value.

6. Cable shielding according to claim 1, wherein the first direction and the second direction are at least virtually opposed to one another.

7. Electric cable having:

at least one electrical conductor; and cable shielding according to claim 1 arranged around the electrical conductor.

8. Cable shielding according to claim 1, wherein the first and second wire windings are intertwined such that the radial distances between the longitudinal axis and the first and second wire windings change along the length of the cable shielding.

9. Cable shielding according to claim 1, wherein the first and second wire windings are intertwined such that the first and second wire windings extend over and under one another multiple times along the length of the cable shielding.

10. Cable shielding according to claim 1, wherein the first winding wire and the second winding wire are intertwined with one another at the first crossing point only once per turn of each of the respective first and second winding wires.

11. Cable shielding according to claim 1, wherein the first winding wire and the second winding wire are intertwined with one another at the first crossing point more than once per turn of each of the respective first and second winding wires.

* * * * *